United States Patent Office 3,629,269
Patented Dec. 21, 1971

3,629,269
DERIVATIVES OF THE 2-(LOWER ALKYL)-3-(LOWER ALKYL)-4-PHENYL-3- OR 4-CYCLO-HEXENECARBOXYLIC ACIDS
George Karmas, Bound Brook, N.J., assignor to Ortho Pharmaceutical Corporation
No Drawing. Filed Sept. 26, 1968, Ser. No. 763,026
Int. Cl. C07c 69/76
U.S. Cl. 260—293.81                  7 Claims

ABSTRACT OF THE DISCLOSURE

Compounds of the general formula

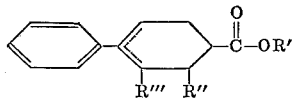

are disclosed wherein R″ and R‴ are selected from the group consisting of lower alkyl of up to 3 carbon atoms; and R′ is selected from the group consisting of alkyl of from 9 to 20 carbon atoms, alkenyl of up to 20 carbon atoms, monohydroxy lower alkyl, dihydroxy lower alkyl, adamantyl, adamantyl lower alkyl, phenyl, phenyl lower alkyl, diphenyl lower alkyl, cycloalkyl, cycloalkyl lower alkyl, carbo lower alkoxy lower alkyl, lower alkoxy lower alkyl, furyl, furyl lower alkyl, carbo lower alkoxy phenyl, piperidyl, piperidyl lower alkyl, phenyl-cyclohexenylmethyl in which the cyclohexenyl group contains substituents selected from the group consisting of hydrogen and lower alkyl of up to 3 carbon atoms and the dotted lines represent a double bond at either the 3- or the 4-position. These compounds exhibit estrogenic properties and when given in a single subcutaneous dose have long acting effects in the suppression of animal reproduction.

The present invention relates to compounds of the general formula

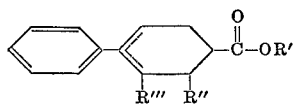

wherein R″ and R‴ are selected from the group consisting of lower alkyl of up to 3 carbon atoms; and R′ is selected from the group consisting of alkyl of from 9 to 20 carbon atoms, alkenyl of up to 20 carbon atoms, monohydroxy lower alkyl, dihydroxy lower alkyl, adamantyl, adamantyl lower alkyl, phenyl, phenyl lower alkyl, diphenyl lower alkyl, cycloalkyl, cycloalkyl lower alkyl, carbo lower alkoxy lower alkyl, lower alkoxy lower alkyl, furyl, furyl lower alkyl, carbo lower alkoxyphenyl, piperidyl, piperidyl lower alkyl, phenyl-cyclohexenylmethyl in which the cyclohexenyl group contains substituents selected from the group consisting of hydrogen and lower alkyl of up to 3 carbon atoms and the dotted lines represent a double bond at either the 3- or the 4-position.

The compounds of the present invention are related to the compounds disclosed in U.S. Pat. 3,344,147 and in my copending patent applications, Ser. No. 662,310; 662,311; 662,295; 560,116; and 728,900. The compounds of the patent and of my copending patent applications are known to possess activity as agents for the suppression of reproduction when fed orally to animals. The compounds of the present invention are active as suppressants of reproduction not only upon oral administration but also when given parenterally and some of the compounds of the present invention can suppress reproduction over a long period of time when given in only one subcutaneous injection.

These compounds are all esters of 2-(lower alkyl)-3-(lower alkyl)-4-phenylcyclohexenecarboxylic acid and analogs of the same and therefore may be prepared by the formation of the acid halide of the cyclohexenyl carboxylic acid (by means of reaction with thionyl chloride or phosphorus halides) followed by reaction with an alcohol of the formula R′OH. Alternatively, the appropriate metal salt of the cyclohexenyl acid may be reacted with a compound of the formula R′-(halide), for example with α-glyceryl monochlorohydrin, or with an alkylsulfonate of the formula R′—OSO₂R″″. A further method consists of preparing the anhydride of the cyclohexenyl acid (for instance, by reacting with acetic anhydride) and condensing the product with a hydroxylic reagent of the formula R′OH.

Furthermore, the anhydride of a 4-hydroxy-4-arylcyclohexanecarboxylic acid may first be prepared after which it is condensed with the appropriate alcohol of the formula R′OH and the resultant ester subsequently dehydrated in the presence of a Lewis acid in order to prepare the corresponding cyclohexenyl carboxylic acid ester. Said dehydration step is preferably effected with hot glacial acetic acid and paratoluenesulfonic acid. This particular reaction sequence is illustrated as follows:

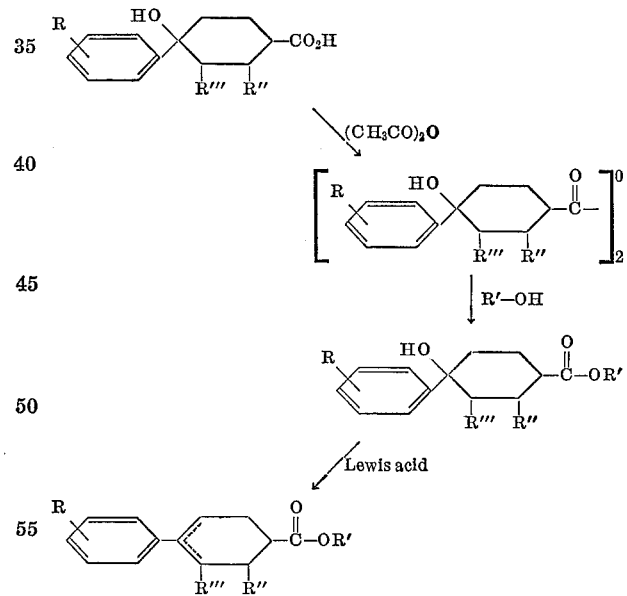

The present compounds may also be prepared by acid catalysed esterification between the cyclohexenyl carboxylic acid and an alcohol of the formula R′OH; transesterification, in which the R′O—group of the ester is replaced with another R′—O group under basic catalysis; or by the reaction of the cyclohexenyl carboxylic acid with a diazoalkane or an olefin. The latter two processes may be generally illustrated as follows:

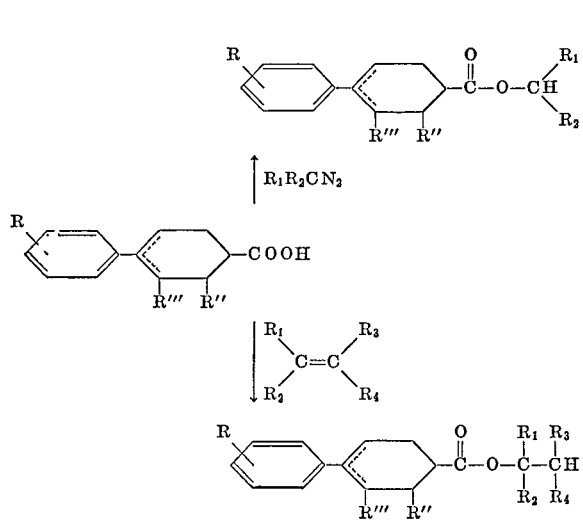

In the above formulae, $R_1$, $R_2$, $R_3$ and $R_4$ represent hydrogen or a wide range of substituents such as alkyl, alkenyl and substituted alkyl or alkenyl.

The following examples illustrate the preparation of some of the compounds of the invention. While only one method of preparation is disclosed for each compound, it is to be understood that a number of the other methods noted above can also be utilized.

In said examples, reference to the *drying* of organic solutions implies the use of anhydrous magnesium sulfate or sodium sulfate, *evaporation* is invariably performed under vacuum (most conveniently that obtained with a waterpump aspirator), filtration is with suction, *temperatures* are degrees centigrade, and *melting points* are corrected.

Infrared spectra (neat for oils, KBr pellets for solids) were taken on Beckman IR–5 spectrophotometer and proton magnetic resonance (NMR) spectra on a Varian A–60 instrument. NMR spectral data are given as chemical shift values, $\delta$, in p.p.m. The $\delta$ values given in the following exampes are those assignable, where possible, to a vinyl proton on the cyclohexene ring and to the 2-methyl and 3-ethyl groups.

ESTERS FROM A SODIUM CARBOXYLATE AND A HALIDE.—EXAMPLE 1

β,γ-Dihydroxypropyl 2-methyl-3-ethyl-4-phenyl-4-cyclohexenecarboxylate

A solution of 2.0 g. of 2-methyl-3-ethyl-4-phenyl-4-cyclohexenecarboxylic acid reported in U.S. Pat. No. 3,344,147 and 0.5 g. of sodium hydroxide in 25 ml. of methanol plus 60 ml. of dimethylformamide is evaporated to a volume of 40 ml. and to the resulting slurry is added 4 ml. of α-glyceryl monochlorohydrin. This mixture is heated at 100° for 2½ hours and then it is evaporated to remove dimethylformamide. The residue is shaken with ether and water and then the ether phase is washed twice with cold 5% sodium hydroxide and four times with water. Evaporation of the dried ether solution leaves a viscous oil which slowly crystallizes. Recrystallization from ether-hexane affords 1.30 g. of fine white flakes, M.P. 72–73°.

$\lambda\lambda_{max}$: 2.89, 5.81, 8.25, 8.48, 8.56, 11.83, 13.21, 14.20μ (KBr)

NMR (CDCl$_3$): 0.80, 0.85, 0.92, 1.01; 5.65.

Calcd. for $C_{19}H_{26}O_4$ (percent): C, 71.67; H, 8.23. Found (percent): C, 71.78; H, 8.17.

ESTERS FROM ACID CHLORIDE AND AN ALCOHOL.—EXAMPLE 2

1-adamantyl 2-methyl-3-ethyl-4-phenyl-4-cyclohexenecarboxylate

A mixture of 3.0 g. of 2-methyl-3-ethyl-4-phenyl-4-cyclohexenecarboxylic acid and 15 ml. of thionyl chloride is refluxed for fifteen minutes and then the yellow solution is evaporated and the residual oil is distilled to afford 3.0 g. of the acid chloride, a mobile yellow oil which boils at 100–102°/.02 mm. and has $n_D^{23}$ 1.5527 and $\lambda\lambda_{max.}$: 5.57, 9.98, 11.63, 12.35, 13.10–13.40, 14.28μ (neat).

The distilled acid chloride is added to a chilled (5–10°), vigorously stirred solution of 1½ molecular equivalent of 1-hydroxyadamantane in 20 ml. of dry pyridine. This reaction mixture is stirred at 25° for 15 minutes and then heated at 90–95° for 15 minutes. Then it is cooled and 5 ml. of water is added and the mixture is stirred vigorously for 2 hours. After dilution with 150 ml. of ether, the ether phase is washed twice with cold 5% hydrochloric acid to remove pyridine, then twice with cold 5% soduim hydroxide and then the ether solution is dried and evaporated. The residual oil is developed on a column of alumina (neutral, W–1) prepared in benzene-hexane. Elution with benzene and ether affords the ester free of alcohol and carboxylic acid. A crystalline ester is recrystallized from methanol, and an oily ester is distilled under high vacuum to afford the following purified product: 1-adamantyl 2-methyl-3-ethyl-4-phenyl-4-cyclohexenecarboxylate: M.P. 94–95°.

$\lambda\lambda_{max.}$: 5.81, 8.22, 8.49, 9.42, 10.23, 13.14, 14.20μ (KBr)

NMR(CDCl$_3$): 0.77, 0.83, 0.88, 5.63.

Calcd. for $C_{26}H_{34}O_2$ (percent): C, 82.49; H, 9.05. Found (percent): C, 82.32; H, 9.17.

EXAMPLE 3

Benzhydryl 2-methyl-3-ethyl-4-phenyl-4-cyclohexenecarboxylate

This compound is prepared following the procedure of Example 2, and using benzhydrol in the place of 1-hydroxyadamantane.

The compound is a viscous yellow oil of B.Pt. 190–200°/.001 mm.;

$\lambda\lambda_{max}$: 5.79, 8.63, 10.07, 11.80, 13.20, 14.26μ (neat). NMR (CDCl$_3$): 0.70, 0.81, 0.89; 5.65.

Calcd. for $C_{29}H_{30}O_2$ (percent): C, 84.84; H, 7.37. Found (percent): C, 85.05; H, 7.45.

EXAMPLE 4

Cyclopentyl 2-methyl-3-ethyl-4-phenyl-4-cyclohexenecarboxylate

This compound is prepared following the procedure of Example 2, and using cyclopentanol in the place of 1-hydroxyadamantane.

Distillation (without prior chromatography) gives an oil, B.P. 125–130°/0.001 mm. This solidifies and is recrystallized from methanol to give white flakes, M.P. 58–59°. Yield: 75%.

$\lambda\lambda_{max}$: 5.81, 8.29, 8.64, 11.90, 13.25, 14.23μ (KBr) Empirical formula: $C_{21}H_{28}O_2$

*Analysis.*—Calcd. (percent): C, 80.73; H, 9.03. Found (percent): C, 80.81; H, 9.04.

EXAMPLE 5

Decyl 2-methyl-3-ethyl-4-phenyl-4-cyclohexenecarboxylate

This compound is prepared following the procedure of Example 2, and using n-decyl alcohol in the place of 1-hydroxyadamantane.

Chromatography, followed by distillation (B.P. 175–180° at .001 mm.) affords the decyl ester as a very pale yellow, mobile oil.

λλ$_{max}$: 5.78, 8.29, 8.60, 11.88, 13.22, 14.27μ
Emperical formula: $C_{26}H_{40}O_2$ Calcd. (percent): C, 81.20; H, 10.48. Found (percent): C. 80.78, 80.75; H, 10.29, 10.49.

EXAMPLE 6

(2-methyl-3-ethyl-4-phenyl-4-cyclohexenyl-1)-methyl 2-methyl-3-ethyl-4-phenyl-4-cyclohexenecarboxylate To a stirred solution of 2.9 g. of (2-methyl-3-ethyl-4-pheneyl - 4 - cyclohexenyl - 1)methanol (prepared as described in U.S. Pat. No. 3,334,147) in 12 ml. of pyridine is added 3 g. of distilled 2-methyl-3-ethyl-4-phenyl-4-cyclohexenecarbonyl chloride (prepared as described in Example 2). This mixture is heated at 90–95° for twenty minutes and then ice and ether are added. This mixture is shaken and then separated. The ether solution is washed twice with cold dilute hydrochloric acid and then with water and dilute sodium hydroxide. The residue obtained from drying and evaporation of the ether solution is triturated with pentane and stored at 0° to afford 2.4 g. of a crystalline solid ester which is recrystallized from ether and from acetone to afford 1.65 g. of (2-methyl - 3 - ethyl - 4 - phenyl - 4 - cyclohexenyl-1)methyl 2 - methyl - 3 - ethyl - 4 - phenyl - 4 - cyclohexenecarboxylate, white granules of M.P. 153–156°.

λλ$_{max}$: 5.77, 8.23, 8.43, 8.51, 9.94, 11.80, 13.14, 14.12, 14.22μ (KBr)
Empirical formula: $C_{32}H_{40}O_2$ Calcd. (percent): C, 84.16; H, 8.83. Found (percent): C, 84.05; H, 8.88.

EXAMPLE 7

2-adamantyl 2-methyl-3-ethyl-4-phenyl-4-cyclohexenecarboxylate 3.0 g. of 2-methyl-3-ethyl-4-phenyl-4-cyclohexenecarboxylic acid is converted to the acid chloride as described in Example 2. The distilled acid chloride is added to a solution of 2-hydroxyadamantane in 10 ml. of dry pyridine. This reaction mixture is maintained at 25° for 10 minutes and then it is heated at 90–95° for 10 minutes. Six drops of water are added and heating is continued for 5 minutes longer. After cooling, the reaction mixture is diluted with ether and then it is washed with dilute hydrochloric acid, water, and dilute potassium carbonate. Drying and evaporation of the ether solution affords a viscous yellow oil which is developed on a chromatograhic column of neutral alumina. Elution with benzene-ether affords the ester as a colorless oil which slowly solidifies. This is recrystallized twice from hexane to afford 1.8 g. of 2-admantyl 2-methyl-3-ethyl-4-phenyl-4-cyclohexenecarboxylate, fine white prisms which melt at 83–84°.

λλ$_{max}$: 5.78, 8.25, 8.54, 9.91, 13.04, 13.23, 14.20μ (KBr)
Empirical formula: $C_{26}H_{34}O_2$ Calcd. (percent): C, 82.49; H, 9.05. Found (percent): C, 82.57; H, 8.95.

EXAMPLE 8

1-adamantylmethyl 2-methyl-3-ethyl-4-phenyl-4-cyclohexenecarboxylate 3,0 g. of 2-methyl-3-ethyl-4-phenyl-4-cyclohexene-carboxylic acid is converted to the acid chloride as described in Example 2. The distilled acid chloride is then reacted with 2.0 g. of 1-adamantylmethanol in pyridine as described for Example 7. The working up and chromatography are as for the compound of Example 7 and there is thus obtained 2.8 g. of 1-adamantylmethyl 2-methyl-3-ethyl-4-phenyl-4-cyclohexenecarboxylate, a very viscous oil which is freed of solvent under high vacuum. This ester may be distilled at 180–190°/.001 mm., but this causes partial decomposition and is not a useful method of purification.

λλ$_{max}$: 5.79, 6.90, 8.28, 8.60, 9.90, 11.88, 13.20, 14.28μ.
Empirical formula: $C_{27}H_{36}O_2$ Calcd. (percent): C, 82.60; H, 9.24. Found (percent): C, 82.87; H, 9.23.

EXAMPLE 9

Benzyl 2-methyl-3-ethyl-4-phenyl-4-cyclohexenecarboxylate

This ester is prepared from the cyclohexenyl acid chloride and benzyl alcohol, following the procedure of Example 2. Chromatography, followed by distillation (B.Pt. 170–173° at 0.001 mm.) affords the benzyl ester as a colorless oil.

λλ$_{max}$: 5.79, 8.30, 8.63, 9.95, 11.85, 13.28, 14.30μ.
Empirical formula: $C_{23}H_{26}O_2$ Calcd. (percent): C, 82.59; H, 7.84. Found (percent): C, 82.79; H, 7.88.

EXAMPLE 10

2-nonadecyl 2-methyl-3-ethyl-4-phenyl-4-cyclohexenecarboxylate

This ester is prepared from the cycohexenyl acid chloride and 2-nonadecanol, following the procedure of Example 2. Chromatography on alumina affords the crude ester free of the fatty alcohol, and distillation gives the ester as a yellow oil of B.Pt. 230–235°/0.001 mm.

λλ$_{max}$: 5.78, 8.27, 8.58, 11.87, 13.20, 14.28μ.
Empirical formula: $C_{35}H_{58}O_2$ Calcd. (percent): C, 82.29; H, 11.45. Found (percent): C, 82.19; H, 11.71.

EXAMPLE 11

2-methyl-2-butenyl 2-methyl-3-ethyl-4-phenyl-3-cyclohexenecarboxylate

This ester is prepared from the cyclohexenyl acid chloride and 2,3-dimethylallyl alcohol, following the procedure of Example 2. Chromatography on alumina affords crude ester and distillation gives the desired ester as a colorless oil of B.Pt. 125–130° at .001 mm.

λλ$_{max}$: 5.78, 8.64, 10.00, 12.04, 13.13, 14.27μ.
Empirical formula: $C_{21}H_{28}O_2$ Calcd. (percent): C, 80.73; H, 9.03. Found (percent): C, 80.57; H, 8.89.

EXAMPLE 12

2-methyl-2-butenyl 2-methyl-3-ethyl-4-phenyl-4-cyclohexenecarboxylate

This ester is prepared from the Δ$^4$-cyclohexenyl acid chloride and 2,3-dimethylallyl alcohol, following the procedure of Example 2. Chromatography on alummina affords crude ester and distillation gives the desired ester as a colorless oil or B.Pt. 135–140°/.001 mm.

λλ$_{max}$: 5.78, 8.29, 8.63, 10.04, 11.89, 12.06, 13.27, 14.27μ.
Empirical formula: $C_{21}H_{28}O_2 = 312.4$

*Analysis.*—Calcd. (percent): C, 80.73; H, 9.03. Found (percent): C, 81.06; H, 9.02.

EXAMPLE 13

1-furylmethyl 2-methyl-3-ethyl-4-phenyl-4-cyclohexenecarboxylate

This ester is prepared from the cyclohexenyl acid chloride and furfuryl alcohol, following the procedure of Example 2. Chromatography affords a crystalline ester which is purified by recrystallization from ether to afford the 1-furylmethyl ester, white prisms of M.P. 83–84°.

$\lambda\lambda_{max}$: 5.80, 8.29, 8.56, 8.62, 11.9–12.0, 13.11, 13.41, 14.20µ (KBr)
Empirical formula: $C_{21}H_{24}O_3$ Calcd. (percent): 77.75, H, 7.46. Found (percent): C, 78.02; H, 7.67.

EXAMPLE 14 p-Carbomethoxyphenyl 2-methyl-3-ethyl-4-phenyl-4-cyclohexenecarboxylate

This ester is prepared from the cyclohexenyl acid chloride and methyl p-hydroxybenzoate, following the procedure of Example 2. Chromatography, followed by recrystallization from ether gives the ester as white granules of M.Pt. 105–106°.

$\lambda\lambda_{max}$: 5.70, 5.86, 7.78, 8.39, 8.80, 9.00, 11.79, 13.08, 13.30, 13.60, 14.27µ.
Empirical formula: $C_{24}H_{26}O_4$ Calcd. (percent): C, 76.16; H, 6.93. Found (percent): C, 76.08; H, 6.91.

EXAMPLE 15

2-(N-piperidino)ethyl 2-methyl-3-ethyl-4-phenyl-4-cyclohexenecarboxylate

This ester is prepared from the cyclohexenyl acid chloride and N-(β-hydroxyethyl)piperidine, following the procedure of Example 2, but omitting acid washes which are normally used to remove pyridine. Pyridine is, in this example, removed by evaporation. Chromatography, followed by distillation, affords the ester as a yellow oil of B.Pt. 165–170° at 0.001 mm.

$\lambda\lambda_{max}$: 5.78, 8.30, 8.61, 11.88, 13.20, 14.29µ.
Empirical formula: $C_{23}H_{33}O_2N$ Calcd. (percent): C, 77.70; H, 9.36. Found (percent): C, 77.71; H, 9.10.

EXAMPLE 16

Decyl 2-methyl-3-ethyl-4-(p-cyclopentoxyphenyl)-3-cyclohexenecarboxylate

This ester is prepared just as described in Example 2, starting with 0.5 g. of 2-methyl-3-ethyl-4-(p-cyclopentoxyphenyl)-3-cyclohexenecarboxylic acid prepared as disclosed in U.S. application 662,310 and n-decyl alcohol and following the same procedure of isolation, purification by chromatography and distillation. There is obtained 0.5 g. of the subject decyl ester, a viscous yellow oil which boils at 205–210° at 0.001 mm.

$\lambda\lambda_{max}$: 5.75, 8.03, 8.61, 10.05, 12.08µ.
Empirical formula: $C_{31}H_{48}O_3 = 469.7$ Analysis.—Calcd. (percent): C, 79.43; H, 10.32. Found (percent): C, 79.08; H, 10.41.

EXAMPLE 17

Decyl 2-methyl-3-ethyl-4-(p-hydroxyphenyl)-3- and 4-cyclohexenecarboxylate (A) 1.0 g. of 2-methyl-3-ethyl-4-(p-acetoxyphenyl)-3- and 4-cyclohexenecarboxylic acid prepared as disclosed in U.S. application No. 560,116 (mixture of isomers) is converted to the acid chloride as described in Example 2. The undistilled acid chloride is converted to the decyl ester with n-decyl alcohol and purified by chromatography, as also described in Example 2, followed by distillation to give 0.6 g. of decyl 2-methyl-3-ethyl-4-(p-acetoxyphenyl)-3- and 4-cyclohexenecarboxylate:

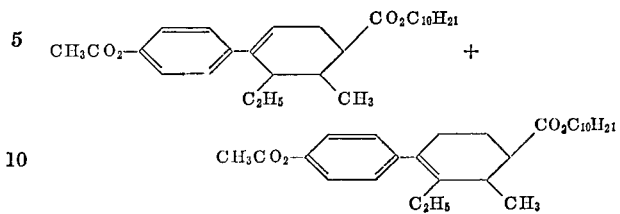

This is a pale yellow viscous oil of B.P. 170–180° at 0.001 mm. The NMR spectrum shows an approximate 1:1 mixture of the $\Delta^3$ and $\Delta^4$ isomers.

Analysis.—Calcd. for $C_{28}H_{42}O_2$ (percent): C, 75.97; H, 9.56. Found (percent): C, 75.84; H, 9.69.

(B) The distilled mixture of isomers described in A, (col. 7, lines 69–75) is refluxed for eight minutes in 30 ml. of methanol containing 4 ml. of water and 0.8 g. of potassium bicarbonate. The resulting clear solution is evaporated to remove methanol and the oily product is extracted with ether. The ether solution is dried and concentrated, and the residue is distilled to afford 0.5 g. of a very viscous pale yellow oil, B.Pt. 185–195° at 0.001 mm. NMR shows this to be an approximate 1:1 mixture of decyl 2-methyl-3-ethyl-4-(p-hydroxyphenyl)-3-cyclohexenecarboxylate and decyl 2-methyl-3-ethyl-4-(p-hydroxyphenyl)-4-cyclohexenecarboxylate.

Empirical formula: $C_{26}H_{40}O_3 = 400.6$

Analysis.—Calcd. (percent): C, 77.95; H, 10.07. Found (percent): C, 76.96; H, 10.01.

EXAMPLE 18

Decyl 2-methyl-3-ethyl-4-(m-tolyl)-3-cyclohexenecarboxylate

A mixture og 0.5 g. of 2-methyl-3-ethyl-4-(m-tolyl)-3-cyclohexenecarboxylic acid (Example 6 of U.S. application No. 662,311) and 5 ml. of thionyl chloride is refluxed for 15 minutes and then diluted with 10 ml. of toluene and evaporated under vacuum to a viscous oil of the acid chloride. The latter is treated with a solution of 1 ml. of decyl alcohol in 5 ml. of pyridine and this mixture is heated at 95° for 20 minutes and then diluted with hexane and washed with dilute hydrochloric acid. The hexane solution is dried and evaporated and the residual crude ester is chromatographed on alumina. Elution with benzene+hexane gives the ester, which is distilled to afford 0.4 g. of decyl 2-methyl-3-ethyl-4-(m-tolyl)-3-cyclohexenecarboxylate, a viscous pale yellow oil of B.P. 155–160° at 0.001 mm.

$\lambda\lambda_{max}$: 5.77, 8.63, 994, 12.78, 14.16µ.
Empirical formula: $C_{27}H_{42}O_2 = 398.6$ Analysis.—Calcd. (percent): C, 81.35; H, 10.62. Found (percent): C, 81.24; H, 10.75.

EXAMPLE 19

2-methyl-2-butenyl 2-methyl-3-ethyl-4-(p-anisyl)-3-cyclohexenecarboxylate

This ester is prepared as detailed in Example 18, starting with 0.7 g. of 2-methyl-3-ethyl-4-(p-anisyl)-3-cyclohexenecarboxylic acid (disclosed in U.S. Pat. 2,582,253) and reacting the intermediate acid chloride with tiglyl alcohol (2-methyl-2-buten-1-ol). Isolation and purification are performed as described in Example 18, and the ester is distilled to afford the product as a pale yellow oil (0.55 g.) of B.Pt. 145–150° at 0.001 mm.

$\lambda\lambda_{max}$: 5.75, 8.01, 8.62, 9.65, 9.98, 12.05µ.
Empirical formula: $C_{22}H_{30}O_3 = 342.5$ Analysis.—Calcd. (percent): C, 77.15; H, 8.83. Found (percent): C, 77.33; H, 9.01.

EXAMPLE 20

2-furylmethyl 2-methyl-3-ethyl-4-(o-anisyl)-4-cyclohexenecarboxylate

This ester is prepared according to the procedure detailed in Example 18 starting with 0.7 g. of 2-methyl-3-ethyl-4-(o-anisyl)-4-cyclohexenecarboxylic acid prepared as disclosed in U.S. application No. 662,311 and reacting the intermediate acid chloride with furfuryl alcohol. Isolation and purification are performed as in Example 18, yielding a solid ester which is then recrystallized from hexane to afford the product as white prisms which melt at 81–82°. A weak hydroxyl band in the infrared spectrum, as well as the analytical values, support a formulation with partial molecule of water in the crystal.

$\lambda\lambda_{max.}$: 3.15, 5.77, 8.62, 10.00, 10.27, 10.80, 11.69–11.83, 12.18, 13.04, 13.22$\mu$ (KBr)

Empirical formula: $C_{22}H_{26}O_4 \cdot \frac{1}{4}H_2O = 358.9$

Analysis.—Calcd. (percent): C, 73.62; H, 7.44. Found (percent): C, 73.35; H, 7.33.

EXAMPLE 21

Benzyl 2-methyl-3-ethyl-4-(p-cyclopentoxyphenyl)-3-cyclohexenecarboxylate

This ester is prepared according to the procedure detailed in Example 18, starting with 0.7 g. of 2-methyl-3-ethyl-4-(p-cyclopentoxyphenyl)-3-cyclohexenecarboxylic acid prepared as disclosed in U.S. application No. 662,310, and reacting the intermediate acid chloride with benzyl alcohol. Isolation and purification are performed as in Example 18, and the ester is distilled to afford the product as a viscous oil (0.4 g.) of B.Pt. 190–200° at 0.001 mm.

$\lambda\lambda_{max.}$: 5.75, 8.03, 8.63, 9.94, 10.03, 12.07, 13.30, 13.61, 14.33$\mu$.

Empirical formula: $C_{28}H_{34}O_3 = 418.6$.

Calcd. (percent): C, 80.34; H, 8.19. Found (percent): C, 80.45; H, 8.34.

EXAMPLE 22

Dodecyl 2-methyl-3-ethyl-4-(m-chlorophenyl)-4-cyclohexenecarboxylate

This ester is prepared from the cyclohexenyl acid chloride in which the 4-phenyl group is m-chloro substituted (prepared as disclosed in U.S. application No. 662,311) and n-dodecanol, following the procedure of Example 2. Chromatography on alumina affords the crude ester free of the fatty alcohol and distillation gives the ester as a colorless oil of B.Pt. 195–200°/.001 mm.

$\lambda\lambda_{max.}$: 5.78, 8.60, 10.01, 11.31, 11.88, 12.78, 13.70, 14.33$\mu$.

Empirical formula: $C_{28}H_{43}O_2Cl$.

Calcd. (percent): C, 75.21; H, 9.69. Found (percent): C, 75.28; H, 9.63.

EXAMPLE 23

Decyl 2-methyl-3-ethyl-4-(p-acetoxyphenyl)-3-cyclohexenecarboxylate

The crude acid chloride is prepared as described in Example 2 from 0.6 g. of 2-methyl-3-ethyl-4-(p-acetoxyphenyl)-3-cyclohexenecarboxylic acid (prepared as disclosed in U.S. application No. 560,116) and 5 ml. of thionyl chloride (this follows the general procedure). This crude acid chloride is then reacted with decyl alcohol in pyridine again following the procedure of Example 2. Chromatography on alumina affords crude ester and distillation gives the desired ester as a pale yellow oil of B.Pt. 180–190°/.001 mm.

$\lambda\lambda_{max.}$: 5.67, 5.78, 8.33, 8.60, 9.82, 10.97, 11.80, 12.52$\mu$.

Empirical formula: $C_{28}H_{42}O_4 = 442.6$

Calcd. (percent): C, 75.97; H, 9.56. Found (percent): 75.84; H, 9.69.

EXAMPLE 24

β-Methoxyethyl 2-methyl-3-ethyl-4-phenyl-4-cyclohexenecarboxylate

This ester is prepared from the $\Delta^4$-cyclohexenyl acid chloride and ethylene glycol monomethyl ether, following the procedure of Example 2. Chromatography on alumina affords crude ester and distillation gives the desired ester as a pale yellow oil of B.Pt. 130–135°/.001 mm.

$\lambda\lambda_{max.}$: 5.78, 8.30, 8.60, 8.81, 9.57, 11.57, 11.88, 13.22, 14.25$\mu$.

Empirical formula: $C_{19}H_{26}O_3 = 302.4$

Calcd. (percent): C, 75.46; H, 8.67. Found (percent): C, 75.40; H, 8.50.

EXAMPLE 25

Carbethoxymethyl 2-methyl-3-ethyl-4-phenyl-4-cyclohexenecarboxylate

This ester is prepared from the $\Delta^4$-cyclohexenyl acid chloride and ethyl glycolate, following the procedure of Example 2. Chromatography on alumina affords crude ester and distillation gives the desired ester as a colorless oil of B.Pt. 150–155°/.001 mm.

$\lambda\lambda_{max.}$: 5.68, 5.73, 8.19, 8.34, 8.68, 9.20, 9.31, 9.70, 10.80, 11.80, 13.20, 14.24$\mu$ Empirical formula: $C_{20}H_{26}O_4 = 330.4$ Calcd. (percent): C, 72.70; H, 7.93. Found (percent): C, 72.77; H, 8.09.

While the preparation of only some of the compounds of this invention have been specifically described, one skilled in the art should be able to prepare the remainder of the compounds following the general techniques set forth.

As mentioned previously, the compounds of this invention exhibit anti-littering effects when given orally or parenterally and are estrogenic agents to varying degrees.

Estrogenic effects are measured against the estrogenic effects of estradiol as a standard. In carrying out the test, female rats of Wistar-derived strain are bilaterally ovariectomized under light ether anesthesia. About a week following surgery all animals are given a priming dose of 2–10 μg. estradiol-17β by subcutaneous injection and vaginal smears are taken on each of the next two days. Animals which do not show vaginal cornification are rested a week and reprimed. Rats which respond positively to the priming injection are rested a week and then given a single subcutaneous injection of the test material in sesame oil. Vaginal smears are taken daily to assess the duration of estrogenic response (vaginal cornification) in each animal as opposed to the vaginal cornification induced by the priming. The results, tabulated in Table I, for certain of the compounds prepared according to the examples hereinbefore set out show that the compounds of this invention have substantial estrogenic activity.

The parenteral anti-littering properties of the compounds are measured by administering to adult female rats of Wistar-derived strain a single subcutaneous injection of the test material in sesame oil. Controls receive sesame oil vehicle only. Ordinarily twenty animals are assigned to each group.

Both groups are cohabitated with adult male rats in the ratio of 3 males per 5 females starting on the day of treatment. Rats are examined twice weekly for gross signs of pregnancy. Gravid animals are removed and allowed to deliver so that a count of young and their condition may be recorded. The mean interval between drug administration (and cohabitation) and conception is calculated for each group using an average gestation length of 21 days.

Cohabitation is continued for 90 days or until 80% of the females become pregnant, whichever occurs sooner.

The minimum dosage in mg./kg. body weight required to prevent littering in the rats for varous compounds, the preparation of which was specifically described in the examples, is set out in Table I. The actual effect of some of the compounds on littering at various dosage levels is set out in Table II.

While the determination of the antilittering effect of a compound is important in that it shows whether or not a compound will suppress reproduction, it does not pinpoint the precise manner in which reproduction is suppressed. It has been determined that the compounds of the invention are also antizygotic agents. A zygote is the fertilized ovum, and an antizygotic agent is one which destroys the zygote prior to implantation in the uterus. One specific form of zygote destruction is the lysing of the zygote.

In order to determine whether or not a compound is antizygotic, adult male and female rats are cohabitated until sperm is found in the vagina. Following the presence of sperm, the female rats are dosed on two successive days with the compound, and on the ninth day after the presence of sperm is noted, the rats are autopsied and the uteri are examined for the presence of conceptuses. Lack of conceptuses indicates antizygotic effect. A control group of rats is similarly treated except that there is no dosing with the compound under test.

Table I tabulates (for certain compounds) the minimum effective dosage of said compounds needed to obtain an antizygotic effect.

TABLE I

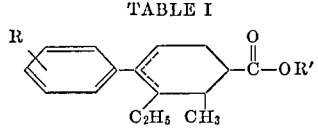

| | | | | Pharmacological activity [2] | | Antilittering | |
|---|---|---|---|---|---|---|---|
| | | | | Anti-zygotic,[3] | Estrogenic [4] | | |
| Example [1] | R | R' | Δ | μg. | | Oral,[5] μg. | Parenteral [6] |
| 1 | H | —CH$_2$CHOHCH$_2$OH | 4 | 10 | 2×EE | 10 | Inact. 5 mg. |
| 2 | H | [cyclic structure] [7] | 4 | 500 | 1/100×EE | 500 | 50 mg. (S-C). |
| 3 | H | —CH(C$_6$H$_5$)$_2$ | 4 | 20 | 2/3×EE | 25 | >2.5 mg. |
| 4 | H | —CH(CH$_2$-CH$_2$)(CH$_2$-CH$_2$) | 4 | | 2×EE | 5 | 1.0 mg. |
| 5 | H | —C$_{10}$H$_{21}$ | 4 | | 1/2×EE | 25 | >1.0 mg. |
| 6 | H | —CH$_2$—⟨ring(CH$_3$)(C$_2$H$_5$)⟩—C$_6$H$_5$ | 4 | | 1×EE | 10 | 1.0 mg. |
| 7 | H | [cyclic structure] | 4 | 10 | 4×EE | 25 | >1.0 mg. |
| 8 | H | —CH$_2$—[cyclic structure] | 4 | | 9/10×EE | 10 | >1.0 mg. |
| 9 | H | —CH$_2$C$_6$H$_5$ | 4 | 25 | 1×EE | >10 | 1.0 mg. |
| 10 | H | —CH(CH$_3$)(CH$_2$)$_{16}$CH$_3$ | 4 | | 3/100×EE | | >2.5 mg. |
| 11 | H | —CH$_2$—C(CH$_3$)=CHCH$_3$ | 3 | | 2×EE | | ≤0.1 mg. |
| 12 | H | Same as above | 4 | | 2×EE | | 2.0 mg. |
| 13 | H | —CH$_2$—[furan] | 4 | 10 | 1.3×EE | 5 | 2.0 mg. |
| 14 | H | —⟨phenyl⟩—CO$_2$CH$_3$ | 4 | | 1×EE | | 1.0 mg. |
| 15 | H | —CH$_2$CH$_2$—N⟨piperidine⟩ | 4 | | 9/10×EE | | 2.5 mg. |
| 16 | ⟨cyclopentyl⟩—O— | —C$_{10}$H$_{21}$ | 3 | | | 20 | |
| 17B | p-HO— | Same as above | 3 | | 1.2×EE | | |

See footnotes at end of table.

TABLE I.—Continued

| Example[1] | R | R' | Δ | Antizygotic,[3] μg. | Estrogenic[4] | Antilittering Oral,[5] μg. | Antilittering Parenteral[6] |
|---|---|---|---|---|---|---|---|
| 18 | m-CH₃ | —C₁₀H₂₁ | 3 | | ⅒×EE | | |
| 19 | p-CH₃O— | —CH₂C(CH₃)=CHCH₃ | 3 | | | | |
| 20 | o-CH₃O— | —CH₂-(furyl) | 4 | | | | |
| 21 | (cyclopentyl)—O— | —CH₂-(phenyl) | 3 | | | | |
| 22 | m-Cl | —C₁₂H₂₅ | 4 | | 5/1000×EE | | >1.0 mg. |
| 23 | p-CH₃C(O)—O— | —C₁₀H₂₁ | 3 | | | | 2.0 mg. |
| 24 | H | —CH₂CH₂OCH₃ | 4 | | 1.5×EE | | 2.0 mg. |
| 25 | H | —CH₂CO₂C₂H₅ | 4 | | 1.5×EE | | 2.0 mg. |

[1] Example in which compound appears.
[2] Pharmacological activity entries are all (female rat) data.
[3] Antizygotic: Oral administration; μg./kg.
[4] Estrogenic: Oral administration; potency is times estradiol as standard.
[5] Antilittering, oral: Administered in the diet or intragastrically; μg./kg.
[6] Antilittering, parenteral: Administered as a single subcutaneous injection (in oil); mg./kg.
[7] This is the 1-adamantyl group.

TABLE II

| Compound of example | Dose, mg./kg. | Number litters/# rats Control | Number litters/# rats Experimental | Mean value day pregnancy occurred Control | Mean value day pregnancy occurred Experimental | Days cohabited |
|---|---|---|---|---|---|---|
| 1 | 1.0 | 19/20 | 19/20 | 5.1 | 10.8 | 34–42 |
|   | 2.5 | 10/10 | 9/10 | 4.7 | 14.0 | 42 |
|   | 5.0 | 20/20 | 13/19 | 4.7 | 15.5 | 34–42 |
| 2 | 1.0 | 10/10 | 9/10 | 11.8 | 6.1 | 33 |
|   | 25.0 | 10/10 | 5/10 | 4.9 | 9.8 | 47 |
|   | 50.0 | 10/10 | 1/10 | 4.9 | 10.0 | 47 |
|   | 100.0 | 9/10 | 2/10 | 6.8 | 5.30 | 91 |
| 3 | 1.0 | 10/10 | 6/10 | 4.0 | 9.3 | 61 |
|   | 2.5 | 9/10 | 4/10 | 3.9 | 9.0 | 91 |
| 4 | 0.1 | 9/10 | 8/10 | | 8.6 | 35 |
|   | 1.0 | | 0/10 | | | >41 |
| 6 | 0.1 | 9/10 | 8/10 | 3.6 | 8.1 | 21 |
|   | 1.0 | | 2/10 | | >12.0 | >41 |

What is claimed is:

1. β - γ - Dihydroypropyl 2 - methyl - 3 - ethyl - 4-phenyl-4-cyclohexenecarboxylate.

2. Benzhydryl 2 - methyl - 3 - ethyl - 4 - phenyl - 4-cyclohexenecarboxylate.

3. (2 - methyl - 3 - ethyl - 4 - phenyl - 4 - cyclohexenyl - 1) - methyl 2 - methyl - 3 - ethyl - 4 - phenyl-4-cyclohexenecarboxylate.

4. Benzyl 2 - methyl - 3 - ethyl - 4 - phenyl - 4 - cyclohexenecarboxylate.

5. 1 - furylmethyl 2 - methyl - 3 - ethyl - 4 - phenyl-4-cyclohexenecarboxylate.

6. p-Carbomethoxyphenyl 2 - methyl - 3 - ethyl - 4-phenyl - 4 - cyclohexenecarboxylate.

7. 2 - (N - piperidino) ethyl 2 - methyl - 3 - ethyl-4-phenyl-4-cyclohexenecarboxylate.

References Cited

UNITED STATES PATENTS 3,344,147   9/1967   Mebane _____ 260—326.5

HENRY R. JILES, Primary Examiner

G. T. TODD, Assistant Examiner

U.S. Cl. X.R.

260—347.4, 469, 473, 520, 546; 424—267, 285, 308